United States Patent [19]

Vácha et al.

[11] Patent Number: 4,532,160

[45] Date of Patent: Jul. 30, 1985

[54] METHOD AND APPARATUS FOR COATING FILAMENTARY OBJECTS

[75] Inventors: Lubos J. B. Vácha, Tyresö; Ulf H. Lindborg, Lidingö, both of Sweden

[73] Assignee: Telefonaktiebolaget LM Ericsson, Stockholm, Sweden

[21] Appl. No.: 521,759

[22] PCT Filed: Dec. 1, 1982

[86] PCT No.: PCT/SE82/00410

§ 371 Date: Jul. 27, 1983

§ 102(e) Date: Jul. 27, 1983

[87] PCT Pub. No.: WO83/01946

PCT Pub. Date: Jun. 9, 1983

[30] Foreign Application Priority Data

Dec. 3, 1981 [SE] Sweden .................................. 8107238

[51] Int. Cl.³ .......................... B05C 3/05; B05C 3/12
[52] U.S. Cl. ................... 427/434.5; 118/405; 118/420; 427/434.7

[58] Field of Search .......... 118/405, 420, 57; 427/434.5, 434.7

[56] References Cited

U.S. PATENT DOCUMENTS

| 2,989,942 | 6/1961 | Freeman | 118/57 |
| 3,022,802 | 2/1962 | Lewis | 427/434.5 X |
| 3,210,843 | 10/1965 | Seul et al. | 118/57 |

Primary Examiner—John P. McIntosh
Attorney, Agent, or Firm—Roberts, Spiecens & Cohen

[57] ABSTRACT

In the manufacture of optical fibres (18) these are coated as quickly as possible with a mechanical protection, suitably in the form of a coating of silicon rubber. The coating is provided by having the fibre pass through a bath (21) of coating material after drawing. As soon as the drawing rate exceeds a certain limit the applied coating becomes uneven. In accordance with the invention this limit can be substantially increased by placing a vibrating member (23), which is in contact with the bath surface, adjacent the point (27) where the fibre (18) passes into the bath (21).

7 Claims, 1 Drawing Figure

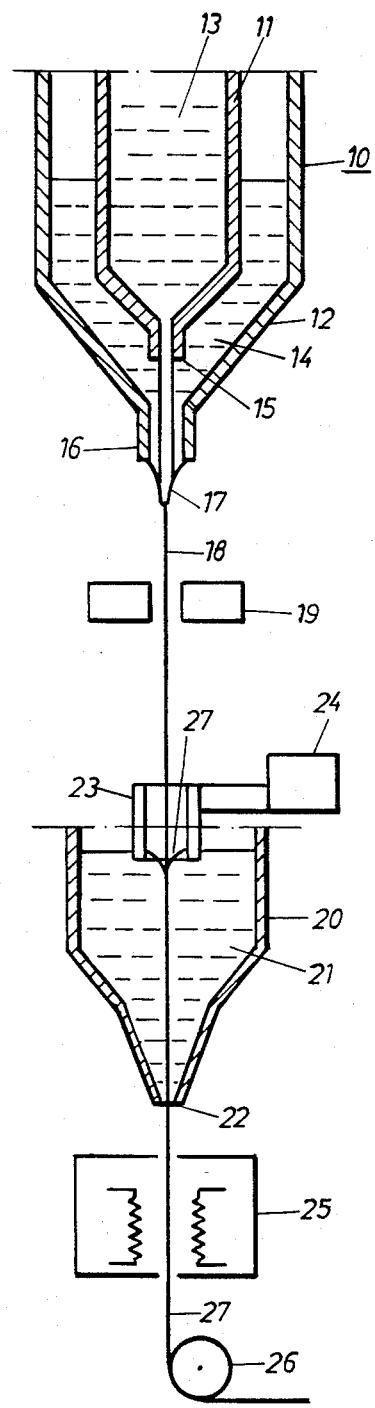

METHOD AND APPARATUS FOR COATING FILAMENTARY OBJECTS

FIELD OF THE INVENTION

The invention relates to apparatus for coating filaments, preferably optical fibres.

BACKGROUND

In producing optical fibres the aim is to provide the fibre with a coating as soon as possible after drawing. This coating usually being of silicon rubber is used for increasing the fibre strength, so that it can be handled without risk of breakage during reeling and during a following cable manufacture. Immediately after the glass fibre has been drawn from a so-called preform, or from a crucible, and it has had time to cool somewhat, it is passed through a bath of curable silicon rubber. The silicon rubber layer which adheres to the glass fibre during passage through the bath is heat cured, after which the filament can be wound on a reel. As long as the glass fibre passes through the bath at a rate of about 0.4 m/sec this coating method functions well, and the fibre is coated with a uniform layer of silicon rubber.

SUMMARY OF THE INVENTION

If it is attempted to increase the production rate during fibre drawing, which is quite possible, problems occur with the coating. At a certain critical speed which is about 0.4 m/sec for the silicon rubber used, the coating becomes uneven and can break down so that it will consist of ununiformly distributed lumps.

If the surface where the glass fibre passes into the silicon rubber bath is studied, it is found that at low speeds there is a funnel-like concavity in the surface around the filament. At the critical speed of about 0.4 m/sec, it has been found that this concavity disappears simultaneously as the coating begins to become uneven, and there is an unambiguous relationship between a stable concavity and uniform coating.

In accordance with the invention the speed for which the concavity disappears and for which an uneven coating is risked can be increased considerably.

BRIEF DESCRIPTION OF DRAWING

The invention will now be described in detail while referring to the appended drawing, where FIG. 1 schematically illustrates equipment for drawing and coating optical fibres.

MODE FOR CARRYING OUT THE INVENTION

In FIG. 1, numeral 10 denotes a crucible for glass, in this case a so-called double crucible of the kind described in the article "Optical Fibres" in the Ericsson Review No. 3, 1980 pages 12 and 13. It is primarily intended for producing optical fibres of the so-called "step-index" type, but can also be used in the production of graded index fibres. It includes an inner crucible 11 containing a glass melt 13 with a high refractive index intended to form the core in the glass fibre, and an outer crucible 12 with a glass melt 14 having a low refractive index and intended to form the sheath or casing of the fibre. The glass melt 13 from the inner crucible runs slowly out through the nozzle 15 in the inner crucible 11, passing through the outer crucible and out through the outer nozzle 16. When it passes the nozzle 16, the core is surrounded by glass from the outer crucible. When the glass melt has passed the outer nozzle 16 a meniscus 17 is formed, and from this the glass is drawn out into a thin fibre 18 by means of a capstan 26. The drawn fibre will have a core of the glass 13 and a cladding of the glass 14.

The fibre diameter is dependent on the drawing rate of the capstan and the outflow rate through the nozzles 15 and 16. The diameter is measured by a thickness meter 19, and with the aid of suitable control equipment this meter then controls the drawing speed of the capstan.

After drawing, the fibre 18 is sensitive to scratches and contaminations and must therefore be provided with a protective coating as soon as possible.

This is effected by passing the fibre through a receptacle 20 containing a suitable liquid coating material 21, usually silicon rubber. Other material of elastomeric, thermoplastic or curable types with suitable mechanical, electrical and optical properties can naturally be employed such as UV-curing epoxy acrylate, or KYNAR. The coating can also be a layer of an easily fusible metal such as aluminum. When the fibre passes out through the bottom nozzle of the receptacle 20 it is provided with a coating, which can, if necessary, be hardened during passage through an oven 25.

At the place where the fibre passes into the upper surface of the bath 21 it is surrounded by a tube 23, the lower end of which is immersed in the bath. The tube 23 is connected to a vibrator 24 causing it to vibrate. The funnel-shaped concavity 27 shown in the Figure is prevented from disappearing for a given speed, by means of this vibration. The speed in question is about 0.4 m/sec for the silicon rubber usually used. As soon as the concavity disappears, the coating material applied will have an uneven thickness, and in the worst case it will be collected in uncohesive lumps.

Considerable increase in the drawing speed has been noted for vibration frequencies of the tube 23 from some few Hz to some kHz. For a vibration frequency of 50 Hz and an amplitude of the order of magnitude of 1 mm an increase of the drawing rate from 0.4 m/sec was obtained.

A vibration means comprising a tube which is mechanically connected to a vibrator 24, eg of the electrodynamic type, has been shown in the Figure. However, the vibration means can naturally be constructed in many different ways known per se, eg as a piezoelectric oscillator. It is not necessary for the vibration body to consist of a tube, and it may be one or more vibration bodies placed around the fibre and in contact with the bath 21.

The device in accordance with the invention can naturally also be used for coating glass fibres produced according to other methods, eg the CVD method, or for other filamentary objects in a corresponding manner.

What is claimed is:

1. Apparatus for coating a filamentary object which is passed through a bath of liquid coating material and which has a point of entry into the bath at the surface thereof, said apparatus comprising means surrounding the filamentary object and immersed into the liquid coating material at the point of entry of the filamentary object into the bath of liquid coating material and vibrator means connected to the means surrounding the filamentary object to vibrate the latter means at the surface of the bath into which the filamentary object is introduced whereby the coating of material on the filamentary object will be uniform for increased speeds of travel of the filamentary object.

2. Apparatus as claimed in claim 1 wherein said means which surrounds the filamentary object cooperates with said vibrator means for producing a funnel-shaped concavity at the surface of the bath.

3. Apparatus as claimed in claim 1 wherein said means which surrounds the filamentary object comprises a tube having a lower end immersed in the bath.

4. Apparatus as claimed in claim 3 wherein said tube has an upper end outside said bath.

5. Apparatus as claimed in claim 4 wherein said vibrator means is connected to said tube outside said bath.

6. A method of coating a filamentary object comprising passing a filamentary object through a bath of liquid coating material, the filamentary object having a point of entry into the bath at the upper surface thereof, surrounding said filamentary object at said point of entry by a body which extends into said bath, and vibrating said body to produce vibration at the surface of the bath in a limited region around the point of entry of the filamentary object thereinto whereby to provide uniform coating of the material on the filamentary object for increased speeds to travel thereof through the bath.

7. A method as claimed in claim 6 wherein the vibration applied to the surface of the bath by said body is effected without externally vibrating said filamentary object and produces a funnel-shaped concavity at said surface.

* * * * *